| United States Patent [19] | [11] | 4,238,518 |
|---|---|---|
| Poisson | [45] | Dec. 9, 1980 |

[54] **PROCESS FOR THE PREPARATION OF A STABLE *BETA VULGARIS* EXTRACT**

[75] Inventor: Jacques Poisson, Chatenay Malabry, France

[73] Assignee: Laboratoire L. Lafon, Maisons-Alfort, France

[21] Appl. No.: 900,995

[22] Filed: Apr. 28, 1978

[51] Int. Cl.³ ............................................... A23L 1/272
[52] U.S. Cl. .................................... 426/540; 426/577; 426/250; 8/438
[58] Field of Search ............... 426/250, 271, 540, 425, 426/429, 655, 577; 8/53, 80

[56] References Cited

U.S. PATENT DOCUMENTS

| 1,393,660 | 10/1921 | Beylik | 426/429 |
|---|---|---|---|
| 3,336,141 | 8/1967 | Frisina | 426/271 X |
| 4,115,595 | 9/1978 | Jordan | 426/250 |
| 4,118,516 | 10/1978 | Van Praag | 426/540 |
| 4,132,793 | 1/1979 | Haber et al. | 426/540 |

FOREIGN PATENT DOCUMENTS 1291155   3/1962   France ..................................... 426/250

*Primary Examiner*—Jeanette M. Hunter
*Attorney, Agent, or Firm*—Bacon & Thomas

[57] ABSTRACT

Preparing an edible stabilized betanidine pigment by complexing an extract of *Beta vulgaris* with an acid polysaccharide.

13 Claims, No Drawings

PROCESS FOR THE PREPARATION OF A STABLE BETA VULGARIS EXTRACT

The present invention relates to a process for the preparation of a stable extract of red domestic beetroot (Beta vulgaris) root, useful in particular in pharmacy and the food industry, and to the product thus obtainable. More particularly, the invention is concerned with providing a process for the extraction and stabilisation of the purplish blue red pigment (so called since, although it occurs in the form of a black powder after extraction, it gives purplish-blue red aqueous solutions) contained in the roots of *Beta vulgaris*.

The existence of the purplish-blue red pigment obtainable from the root of *Beta vulgaris* has been known for a long time, and it is also known that it lacks toxicity. Wyler et al. in Helv. Chim. Acta (1959), 42, 1699 describe the preparation of a product in an alakline medium. However, the structure of the substance, shown in Formula I below, was elucidated only recently. As will be seen from Formula I, the pigment, which has been given the name betanidine, has the structure of a glucoside of a betain with an indolic nucleus, and it has a quaternary ammonium function and a carboxylic group. It is accompanied by other pigments in rather small proportions, particularly a yellow pigment of a structure related to the betaxanthines II.

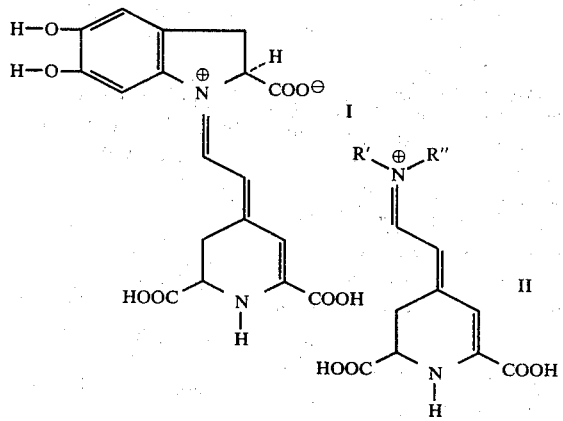

The purplish-blue red pigment of the *Beta vulgaris* root is unstable in both air and in solution so that, in spite of its natural abundance and its lack of toxicity it has not proved possible to employ it in the pharmaceutical and food industries. Indeed, the technician was faced with two technical difficulties, viz. the chemical instability of the pigment and its purification.

We have now discovered a process whereby the purplish-blue red pigment may be extracted from beetroot in a relatively pure and stable form, thereby permitting its use in industry, particularly the pharmaceutical and food industries.

Accordingly, there is provided, in one aspect of the present invention, a process for the preparation of a stable *Beta vulgaris* extract, comprising the steps of:

(i) submitting Beta vulgaris raw material to at least one extraction with a solvent;

(ii) bringing the solution thus obtained, or a solution obtained by redissolving precipitated pigmentary material extracted in step (i), into contact with a support adapted to absorb the pigmentary material;

(iii) thereafter eluting the support with acidified water; and (iv) treating eluate resulting, or pigment separated therefrom by drying, with a sequestering agent to stabilize the pigment. The invention also extends in this aspect to extracts whenever so produced.

In a second and alternative aspect of this invention, we produce a stable purplish-blue red pigment comprising purified betanidine stabilized with a sequestering agent.

The raw beetroot material, which is subjected to one or more extractions in the first step may be either edible red beetroot roots which have been sliced and dried, for example in an oven or by lyophilization, or freshly crushed beet roots.

The alcohols to be used in the first step are particularly lower alkanols such as methanol, ethanol and n-propanol. As the final product is not soluble in the alcohols, it is appropriate, if one or more extractions are performed with an alcohol, to operate in an acidified medium, for example using hydrochloric acid. Similarly, if the solvent used for the extraction stage is a water-alcohol mixture, it will normally be appropriate to operate in an acidified medium. On the other hand, when extracting with water, it is not necessary to add an acid to the water, although it may be advantageous to do so.

Moreover, when the extraction stage is carried out with an alcohol whose pH is less than 7, it is possible, if necessary, to precipitate the violaceous red pigment by means of the addition of an alkaline agent such as NaOH, KOH, LiOH or $H_2NCH_2CH_2OH$. As the violaceous red pigment which is precipitated is impure, it is then purified according to steps (ii) and (iii) and stabilised according to step (iv).

The support used in step (ii) is particularly a selective support for the fixation of polyphenols or an ion-exchange resin for the fixation of the violaceous red pigment by one of its two ionic sites. Suitable supports include polyvinylpyrroidones, polyamides, cellulose and its derivatives and ion-exchange resins of cationic resin type.

The elution of step (iii) is performed by means of slightly acidified water. For example, 0.1% hydrochloric acid, water saturated with $CO_2$ and 1% acetic acid have been successfully used. Generally speaking, the elution is carried out using water with a pH greater than 3 and lower than 7. We prefer to allow about 5 liters of the slightly acidified water to pass over the support for each kilogram of its mass both to wash the support and to remove the yellow pigment. A further 5 to 7 liters/kg. of the acidified water is then used for elution of the desired violaceous red pigment.

The drying of the eluate of step (iii), for example evaporating off water under reduced pressure or by lyophilization, yields the pigment in the form of a black powder giving violaceous red aqueous solutions.

To effect stabilisation of the extract in step (iv), it is possible to use an acid complexing agent. Indeed, although the violaceous red pigment is amphoteric, it exhibits a certain tendency to basicity through its quaternary ammonium function. It is also possible to use metal salt-forming complexes of "lacquer" type at the phenol functions level. The complexing agents which have proved particularly effective are aluminum salts, magnesium salts and acid polysaccharides such as, for example, pectic acid. The preferred complexing agent is pectic acid; this is suitably added in the proportion of 1 to 2 parts by weight for each part by weight of pigment.

When the pigment is intended for use in the food industry it may have 0.1% by weight of sorbic acid and/or 0.1% by weight of ascorbic acid to improve its long term stability (a stored life of several years, if need be).

The invention is illustrated by the Examples which follow:

EXAMPLE I

Roots of edible red beet (*Beta vulgaris* Mog. var. rapa) sliced and dried in an oven or by lyophilization, are exhausted with ethanol acidified with HCl, at decreasing rates starting from 1% (20 liters of hydrochloric ethanol per kilo of dry roots). The extractive solute is then separated by filtration, and then an alkaline agent (NaOH) is added to it. A red precipitate is formed. This is the violaceous red pigment which occurs in a relatively impure form. The yield is 6%-8%.

The precipitate is redissolved in water or hydrochloric ethanol and then brought into contact with a polyvinlpyrrolidone so that the pigment is absorbed thereon (fixing at phenol function level). Elution is then carried out by means of slightly acidified water 1% acetic acid). Evaporation under reduced pressure leads to a black powder which gives violaceous red aqueous solutions.

EXAMPLE 2

Roots of edible red beet (*Beta vulgaris* Mog. var. rapa), in the fresh state, are coarsely crushed and exhausted with the minimum of water (two extractions are performed using each time approx. 1 liter of water per 1 kilo of root, and then the roots are pressed). The extractive solutes are collected, and they are absorbed on a polyamide by passage through a column thereof. A column is used whose height is equal to 12 times the diameter and which is filled with 200 g of polyamide to fix 150 ml of extractive solute originating from 200 g of fresh roots. Elution is performed with 0.1% aqueous hydrochloric acid or with water saturated with $CO_2$. Evaporation of the eluate water (at a reduced pressure or by lyophilization) yields the pure pigment in the form of a black powder which can become fixed on the column; this is no hindrance in the sense that it is eluted with the violaceous red pigment.

The purity of this product may be verified by electrophoresis on paper as indicated in Example 3.

EXAMPLE 3

The dry powder obtained in Example 2 is dissolved in water and the addition is made of 1 to 2 parts by weight of pectic acid for 1 part by weight of dry pigment (of course, if desired the evaporation of the eluate may be avoided, and pectic acid may be added directly to the eluate). After evaporation of the resulting solution a dark red powder is obtained which remains stable even after heating to 40° C.

Characteristics of the Stabilized Pigment (1) It occurs in the form of a powder which is dark red, or violaceous red, in colour, soluble in water, insoluble in methanol and ethanol, practically odourless and of nonsweet taste.

(2) Ultraviolet absorption spectrum
$\lambda max.(\epsilon) = 535 \, nm (10,000)$ (3) Electrophoresis on paper (Macheboeuf-Rebeyrotte apparatus) in pH 4 buffer medium (pyridin-citric acid 0.15 M) at 20° C. for 6 hours, with 4 mA, gives a carmine pink spot at 5 cm from the deposition point, no yellow spot at 7 cm, nor any brown spot at the point of deposition.

(4) The stabilized pigment is distinguished from the violaceous red pigment of the prior art in that in air and in solution it is considerably less susceptible to discolouration of browning (these are deteriorations which are very likely the result of the oxidizing of the non-stabilized pigment).

Thus, the stabilized pigment placed in solution in water and exposed to the light and air in open tubes and sealed flasks retains its colour for several months, while the pigment of prior art discolours or turns brown.

The stabilized pigment described hereinabove is particularly useful for incorporation into a higly stabilized food or drug additive, as described in the further example below.

EXAMPLE 4

The stabilized dry pigment prepared according to Examples 3 above and possessing the characteristics set out was mixed with (i) 0.1% by weight of sorbic acid, (ii) 0.1% by weight of ascorbic acid, and (iii) with 0.1% by weight of each of the said acids. In each case, we have found that the resultant product possesses an improved stability even with respect to the product of Example 3 which already possesses good stability to light and air over several months. The products of Example 4 are accordingly of especial utility as additives for the food and pharmaceutical industries.

What we claim is:

1. A process for preparing a stabilized pigment composition from a betanidine-containing pigmentary material selected from the group consisting of betanidine and betanidine-containing Beta vulgaris extracts comprising the steps of preparing an aqueous solution of the pigmentary material and adding to said solution a stabilizing amount of from about 1 to about 2 parts by weight of an acid polysaccharide per one part by weight of pigmentary material, to obtain a solution of stabilized pigmentary material.

2. The process as defined in claim 1 which further comprises the step of evaporating the solution of stabilized pigmentary material to obtain a stabilized pigment powder composition.

3. The process as defined in claim 1 wherein the acid polysaccharide is pectic acid.

4. The process as defined in claim 1 which comprises the steps of
   (i) subjecting Beta Vulgaris raw material to at least one extraction with a solvent selected from the group consisting of acidified lower alkanols, water and mixtures thereof to obtain an extract solution containing the pigmentary material
   (ii) bringing the extract solution obtained in step (i) into contact with an absorbing material selected from the group consisting of polyvinylpyrrolidones and polyamides whereby the pigmentary material is absorbed onto the absorbing material
   (iii) eluting the absorbing material carrying the pigmentary material with an elution solvent which is acidified water having a pH-value of between about 3 and about 7 to obtain as an eluate an aqueous solution of the pigmentary material
   (iv) adding to the aqueous solution of pigmentary material an amount of from about 1 to about 2 parts by weight of an acid polysaccharide relative to the amount of pigmentary material to obtain a solution of stabilized pigmentary material.

5. The process as defined in claim 4 wherein in step (i) the solvent is an acidified lower alkanol and step (i) further comprises the steps of precipitating the pigmentary material from the extract solution by addition of an alkaline agent, separating the precipitated pigment material from the extract solution and redissolving it in water, an acidified lower alkanol or a mixture thereof to obtain a solution of pigmentary material.

6. The process as defined in claim 4 wherein step (iii) further comprises the steps of evaporating the eluate to obtain a powderous pigmentary material and redissolving the powderous pigmentary material in water.

7. The process as defined in claim 4 wherein the elution solvent is selected from the group consisting of an aqueous 0.1% hydrochloric acid solution, water saturated with $CO_2$ and an aqueous 1% acetic acid solution.

8. The process as defined in claim 4, wherein the Beta vulgaris raw material comprises edible red beet-root roots sliced and dried, and/or crushed fresh beetroots.

9. The process as defined in claim 4, wherein in step (iii) the support is first eluted with about 5 liters of acidified water for each kilogram of absorbing material, the resulting first eluate being discarded; and is then eluted with 5 to 7 liters of acidified water for each kilogram of absorbing material to obtain as a second eluate the aqueous solution of the pigmentary material.

10. A stablized pigment composition comprising as its essential pigment component a complex salt of betanidine and an acid polysaccharide.

11. The stabilized pigment composition as defined in claim 10, wherein the acid polysaccharide is pectic acid.

12. A stablized pigment composition prepared according to the process as defined in claim 1.

13. A stablized food additive comprising the pigment composition as defined in claim 10 mixed with 0.1% of sorbic acid and/or 0.1% of ascorbic acid, based on the weight of the dry material.

* * * * *